(12) United States Patent
Zhao et al.

(10) Patent No.: US 12,127,075 B2
(45) Date of Patent: Oct. 22, 2024

(54) METHOD AND APPARATUS FOR REAL TIME UAV CONNECTION MONITORING AND LOCATION REPORTING

(71) Applicant: Tencent America LLC, Palo Alto, CA (US)

(72) Inventors: Shuai Zhao, Pleasanton, CA (US); Stephan Wenger, Hillsborough, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 360 days.

(21) Appl. No.: 17/746,777

(22) Filed: May 17, 2022

(65) Prior Publication Data

US 2022/0377503 A1    Nov. 24, 2022

Related U.S. Application Data

(60) Provisional application No. 63/190,676, filed on May 19, 2021.

(51) Int. Cl.
*H04W 4/029* (2018.01)
*H04W 64/00* (2009.01)
(Continued)

(52) U.S. Cl.
CPC ......... *H04W 4/029* (2018.02); *H04W 64/003* (2013.01); *H04W 76/19* (2018.02); *H04W 84/06* (2013.01)

(58) Field of Classification Search
CPC ... H04W 4/029; H04W 76/19; H04W 64/003; H04W 84/06
(Continued)

(56) References Cited

U.S. PATENT DOCUMENTS 11,290,736 B1    3/2022  Wang et al.
2012/0281566 A1  11/2012  Pelletier et al.
(Continued)

FOREIGN PATENT DOCUMENTS

WO    2021089312 A1    5/2021

OTHER PUBLICATIONS

International Search Report issued Jul. 29, 2022 in Application No. PCT/US2022/072409, 7 pages.
(Continued)

*Primary Examiner* — Mark G. Pannell
(74) *Attorney, Agent, or Firm* — ARENTFOX SCHIFF LLP

(57) ABSTRACT

In a method of real-time network monitoring and location updating, a location report is received by an unmanned aerial system application enabler (UAE) server from a location management (LM) server. The location report indicates location information of a user equipment (UE). A first network event notification associated with the UE is received by the UAE server from a network resource management (NRM) server. The first network event notification indicates a connection status of the UE with a network. In response to detecting a re-connected status of the UE, a second networking event notification is received by the UAE server from the NRM server. The second networking event notification indicates that the UE reconnects to the network. Further, (i) the second networking event notification, (ii) an identity of the UAE server, and (iii) most recently updated location information of the UE from the LM server are recorded by the UAE server.

20 Claims, 5 Drawing Sheets

(51) Int. Cl.
*H04W 76/19* (2018.01)
*H04W 84/06* (2009.01)

(58) Field of Classification Search
USPC ........................................ 455/456.2
See application file for complete search history.

(56) References Cited

U.S. PATENT DOCUMENTS

| | | |
|---|---|---|
| 2017/0230434 A1 | 8/2017 | Wang et al. |
| 2020/0100080 A1 | 3/2020 | Mladin et al. |
| 2022/0055747 A1 | 2/2022 | Zhao et al. |
| 2023/0239724 A1* | 7/2023 | Pateromichelakis .. H04W 24/10 370/230 |
| 2023/0388748 A1* | 11/2023 | Tangudu ............... H04W 68/00 |

OTHER PUBLICATIONS

Shah et al., "Service Enabler Layer for 5G Verticals", IEEE, 2020, pp. 1-6.
Koubaa et al., "Drone Track: Cloud-Based Real-Time Object Tracking Using Unmanned Aerial Vehicles Over the Internet", IEEE, Mar. 28, 2018, pp. 1-15.

* cited by examiner

METHOD AND APPARATUS FOR REAL TIME UAV CONNECTION MONITORING AND LOCATION REPORTING

INCORPORATION BY REFERENCE

This present disclosure claims the benefit of priority to U.S. Provisional Application No. 63/190,676, "Method and Apparatus for Real Time UAV Connection Monitoring and Location Reporting" filed on May 19, 2021, which is incorporated by reference herein in its entirety.

TECHNICAL FIELD

The present disclosure relates to unmanned aerial vehicle (UAV) communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An unmanned aerial vehicle (UAV), or uncrewed aerial vehicle, can include an aircraft without any human pilot, crew, or passengers on board. UAVs are a component of an unmanned aircraft system (UAS). The UAS can further include a ground-based controller and a system of communications with the UAV. A communication system to support the connectivity needs of unmanned aircraft systems is under development.

SUMMARY

Aspects of the disclosure provide methods and apparatuses of real time network connection status monitoring and location reporting for an unmanned aircraft system (UAS), such as under a 3rd Generation Partnership Project (3GPP) network. In some examples, an apparatus for real time network connection status monitoring and location reporting includes receiving circuitry and processing circuitry.

According to an aspect of the disclosure, a method of real-time network monitoring and location updating for a user equipment (UE) in a service enabler architecture layer (SEAL) architecture is provided. In the method, a location report can be received by an unmanned aerial system application enabler (UAE) server from a location management (LM) server of the SEAL architecture. The location report can indicate location information of the UE. A first network event notification associated with the UE can be received by the UAE server from a network resource management (NRM) server in the SEAL architecture. The first network event notification can indicate a connection status of the UE with a network. In response to detecting a re-connected status of the UE, a second networking event notification can be received by the UAE server from the NRM server, where the second networking event notification can indicate that the UE reconnects to the network. (i) The second networking event notification, (ii) an identity of the UAE server, and (iii) most recently updated location information of the UE from the LM server can be recorded by the UAE server.

In some embodiment, in response to receiving the location report from the LM server, a timestamp associated with the location report can be recorded by the UAE server, where the timestamp can indicate a time when the location report is received.

In the method, in response to the first network event notification indicating an event of a connection loss of the UE, the event and a timestamp associated with the event can be recorded by the UAE server, where the timestamp can indicate a time when the event occurs.

In the method, a timestamp of the second network event notification can be recorded by the UAE server, where the timestamp can indicate a time when the UE is reconnected to the network.

In some embodiments, a timestamp of the most recently updated location information can be recorded by the UAE server. The timestamp can indicate a time when the most recently updated location information of the UE is received.

In the method, a location update between the LM server and a LM client can be triggered by the UAE server.

In some embodiment, the triggering the location update can cause the LM server to send a location information request to the LM client. The location information report can be sent to the LM server by the LM client in response to the location information request. The location information report can indicate the most recently updated location information.

In some embodiment, the UAE server can be subscribed to (i) the real-time network monitoring from the NRM server, and (ii) the location updating from the LM server.

According to another aspect of the disclosure, an apparatus is provided. The apparatus includes processing circuitry. The processing circuitry can be configured to perform any of the methods mentioned above.

Aspects of the disclosure also provide a non-transitory computer-readable medium storing instructions which when executed by a computer cause the computer to perform any of the methods mentioned above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
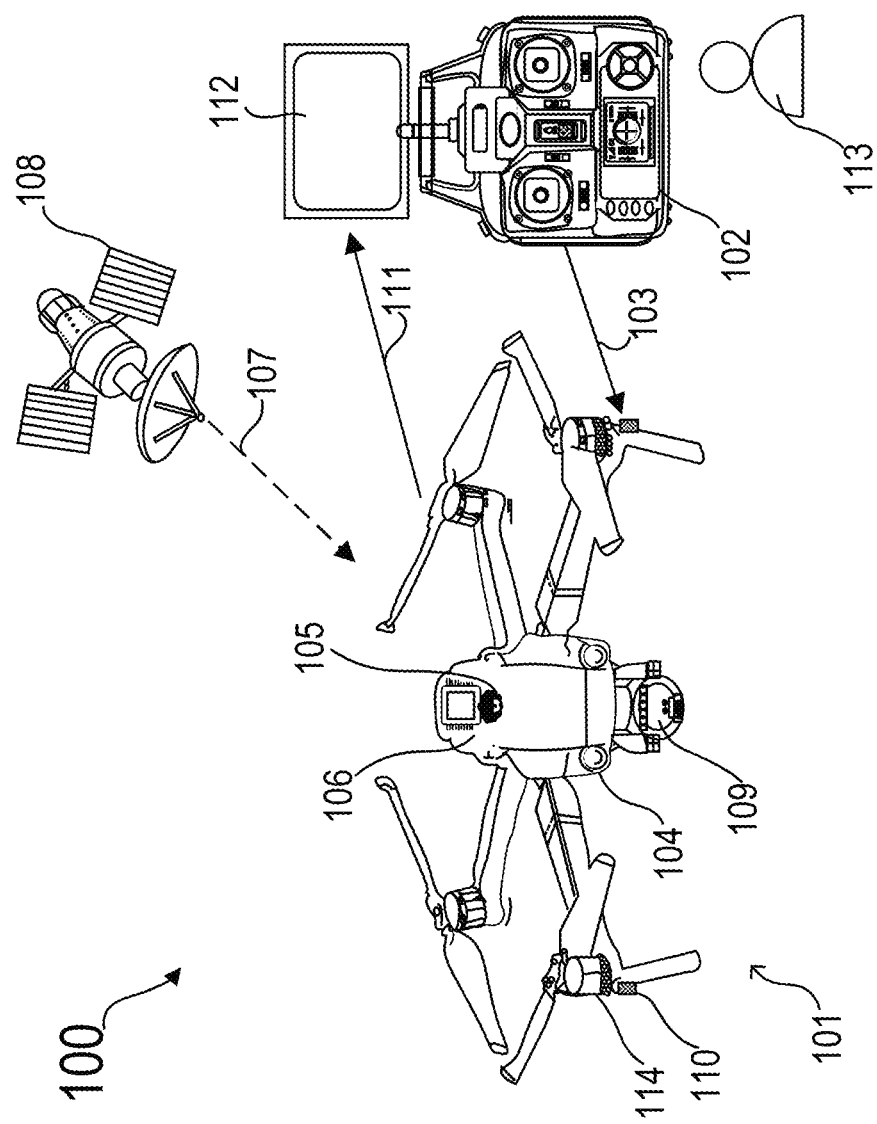
FIG. 1 is a schematic illustration of an Unmanned Aerial System (100) in accordance with an embodiment.

Referring to FIG. 1, an unmanned aerial system (UAS) (100) can include an unmanned aerial vehicle (UAV) (101) and a controller (102). The controller (102) can use a data link (103) to communicate control commands from the controller (102) to the UAV (101). The controller (102) may include at least one communication circuit that is configured to provide communication, through the data link (103), via very high frequency (VHF) and/or ultra-high frequency (UHF), and/or other wireless technology capable of analog and/or digital radio communications. The controller (102) may control power levels of the propulsion unit (114), such as one or more motors and/or engines, of the UAV (101) and/or the control surfaces of a model aircraft (not depicted). More abstract commands like pitch, yaw, and roll, similar to those of helicopters and/or aircrafts can also be used. An experienced pilot can operate the UAV (101) with basic controls, not relying on advanced onboard processing of control signals inside the UAV (101). The UAV (101) can be in a form of a helicopter and/or any other aircraft.

Advances in onboard electronic designs allow the off-loading of certain tasks from the human operator (or user) 113 to the UAV (101) itself. Many UAVs, such as the UAV (101), can include sensor(s) (104) that are coupled to an onboard control circuitry (105) for sensing the attitude as well as the acceleration of the UAV (101). The onboard control circuitry (105) can be a computer system with a scaled-down and/or non-existent user interface. The information obtained by the sensor(s) (104), in addition to the control inputs received from the data link (103) from the controller (102), allows the UAV (10) to remain stable unless a positive control input is obtained from the controller (102).

The UAV (101) can include a receiver (106) for one of the Global Navigation Satellite Systems (GNSS), such as the Global Positioning System (GPS) operated by the United States. FIG. 1 illustrates a single satellite (108) that can provide a communication signal (107), to represent a GNSS. However, the receiver (106) of the UAV (101) may receive communication from a GNSS that includes three or more, and typically four or more, line-of-sight satellites to triangulate the position of the UAV (101) in space. A GNSS receiver, such as the receiver (106), can determine with fair accuracy the position of the UAV (101) in space and time. In the UAV (101), the GNSS can be augmented by additional sensors (e.g., an ultrasonic and/or lidar sensor) of the UAV (101) on the, in many cases, most critical vertical (e.g., Z) axis to enable soft landings (not depicted). The UAV (101) including GNSS capability can offer the user "fly home" and "auto-land" features. Thus, the UAV (101), upon a simple command from the controller (102) (e.g., the push of a single button), or in case of a lost data link (103) from the controller or other timeout of meaningful control input, can fly to a location that was defined as a home location.

The UAV (101) can also include one or more cameras (109). In some cases, the UAV (101) can include a gimbal-mounted camera as one of the cameras (109). The gimbal-mounted camera can be used to record pictures and/or a video of a quality sufficient for the user (113) of the UAV (101), such as in high definition television resolution. The UAV (101) can include other cameras (110) for covering some or all axis of movement. Onboard signal processing based on signals of the other cameras (110) can be used to prevent the UAV (101) from colliding with both fixed and moving objects.

In some cases, the UAV (101) can include a "main" camera as one of the cameras (109). The signal of the "main" camera can be communicated via the data link (111) in real-time towards the human user (e.g., the user (113)), and displayed on a display device (112) included in, attached to, and/or separate from the controller (102). The data link (111) may be the same or different from the data link (103). Accordingly, the UAV (101) may be successfully flown out of line of sight of a human pilot, using a technique known as "First Person View" (FPV).

As a result of the technical developments, UAVs, such as the UAV (101), have become considerably easier to fly, which in turn has made them popular not only with professional UAV pilots and determined and affluent hobbyists, but also the general public. As a result, millions of UAV are now sold every year compared to a few thousand—if that many—model helicopters that were sold about 15 years ago. At the same time, the knowledge, proficiency, and engagement of the user community, on average, has decreased.

A service enabler architecture layer (SEAL) can support vertical applications (e.g., a UAV and vehicle to everything (V2X)). The SEAL functional entities on a user equipment (UE) and a server can be grouped into SEAL client(s) and SEAL server(s) respectively. The SEAL can include a common set of services (e.g., group management, location management) and reference points. The SEAL can offer its services to a vertical application layer (VAL). The VAL can include a VAL client (e.g., UAV) and a VAL server.

Figure 2:
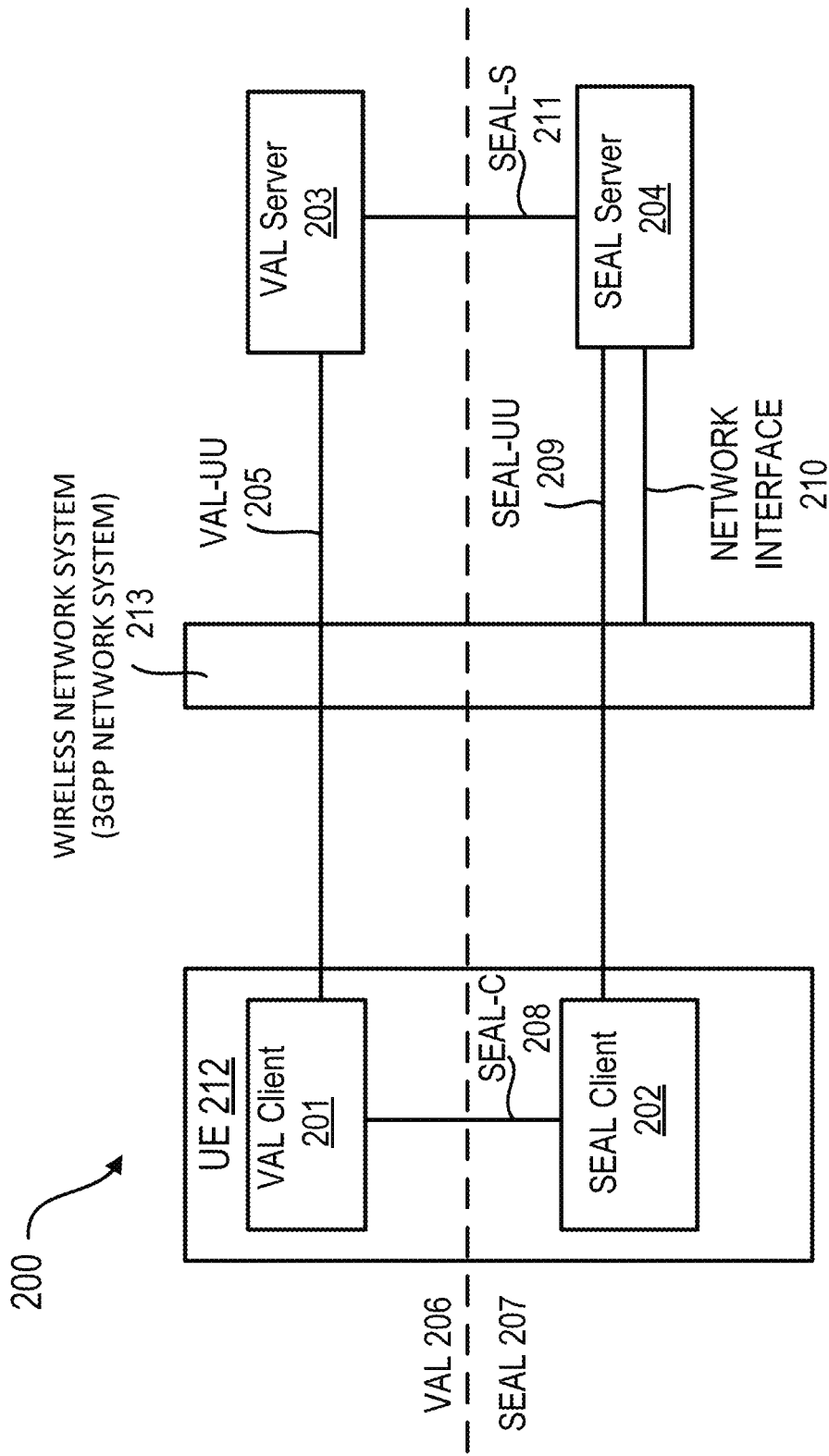
FIG. 2 is an on-network function model (200) for a service enabler architecture layer (SEAL) in accordance with an embodiment.

FIG. 2 shows an exemplary on-network functional model (200) for a service enabler architecture layer (SEAL). The model (200) can be used for network resource management and include a vertical application layer (VAL) (206) and the SEAL (207) over 3GPP wireless networks, such as a 3GPP network system (213), to support vertical applications (e.g., UAV and vehicle to everything (V2X) applications). The model (200) is illustrated as a functional architecture to include common application plane and signaling plane entities. A set of common services (e.g., group management, configuration management, location management) of the model (200) can be shared across vertical applications.

As shown in FIG. 2, the VAL (206) can include a VAL client (201), and a VAL server (203). The SEAL (207) can include a SEAL client (202) and a SEAL server (204). The VAL client (201) and the SEAL client (202) can be communicative coupled to each other to form a User Equipment (212). The SEAL functional architecture shown in FIG. 2 can take into consideration common capabilities to support mission critical and other vertical applications.

Referring to FIG. 2, the VAL client (201) can communicate with the VAL server (203) over VAL-UU (205) reference point. VAL-UU (205) can support both unicast and multicast delivery modes.

The SEAL functional entities on the User Equipment (212) and the server can be grouped into SEAL client(s) (202) and SEAL server(s) (204), respectively. The SEAL (207) can include a common set of services (e.g., group management, location management) and reference points. The SEAL (207) can provide services to the VAL (206).

The SEAL client(s) (202) can communicate with the SEAL server(s) (204) over the SEAL-UU (209) reference points. The SEAL-UU (209) can support both unicast and multicast delivery modes. The SEAL client(s) (202) can provide the service enabler layer support functions to the VAL client(s) (201) over SEAL-C reference points (208). The VAL server(s) (203) can communicate with the SEAL server(s) (204) over the SEAL-S (211) reference points. The SEAL server(s) (204) may communicate with the underlying 3GPP network systems, such as the 3GPP network system (213), using the respective 3GPP interfaces (e.g., 210) specified by the 3GPP network system.

The specific SEAL client(s) (202) and the SEAL server(s) (204) along with their specific SEAL-UU (209) reference points and the specific network interfaces (210) of 3GPP network system (213) can be provided in the respective on-network functional model for each SEAL service.

The VAL client (201) can provide the client side functionalities corresponding to the vertical applications (e.g., UAV, V2X client). The VAL client (201) can support interactions with the SEAL client(s) (202).

The VAL server (203) can provide the server side functionalities corresponding to the vertical applications (e.g., UAV, V2X application servers).

The SEAL client (202) can provide the client side functionalities corresponding to the specific SEAL service, such as a location management, a group management, a configuration management, an identity management, a key management, and a network resource management. The SEAL client(s) can support interactions with the VAL client(s) (201). The SEAL client also can support interactions with the corresponding SEAL client between the two UEs. For example, a first SEAL client (e.g., SEAL client (202)) of a first UE (e.g., UE (212)) can interact with a second SEAL client (not shown) of a second UE (not shown).

The SEAL server (204) can provide the server side functionalities corresponding to the specific SEAL service, such as the location management, the group management, the configuration management, the identity management, the key management, and the network resource management. The SEAL server (204) can support interactions with the VAL server(s) (203).

The disclosure includes exemplary information flows and data points that can be provided to enable real time network status reporting and location updating for a UAS operation under a 3GPP network using a SEAL architecture.

Figure 3:
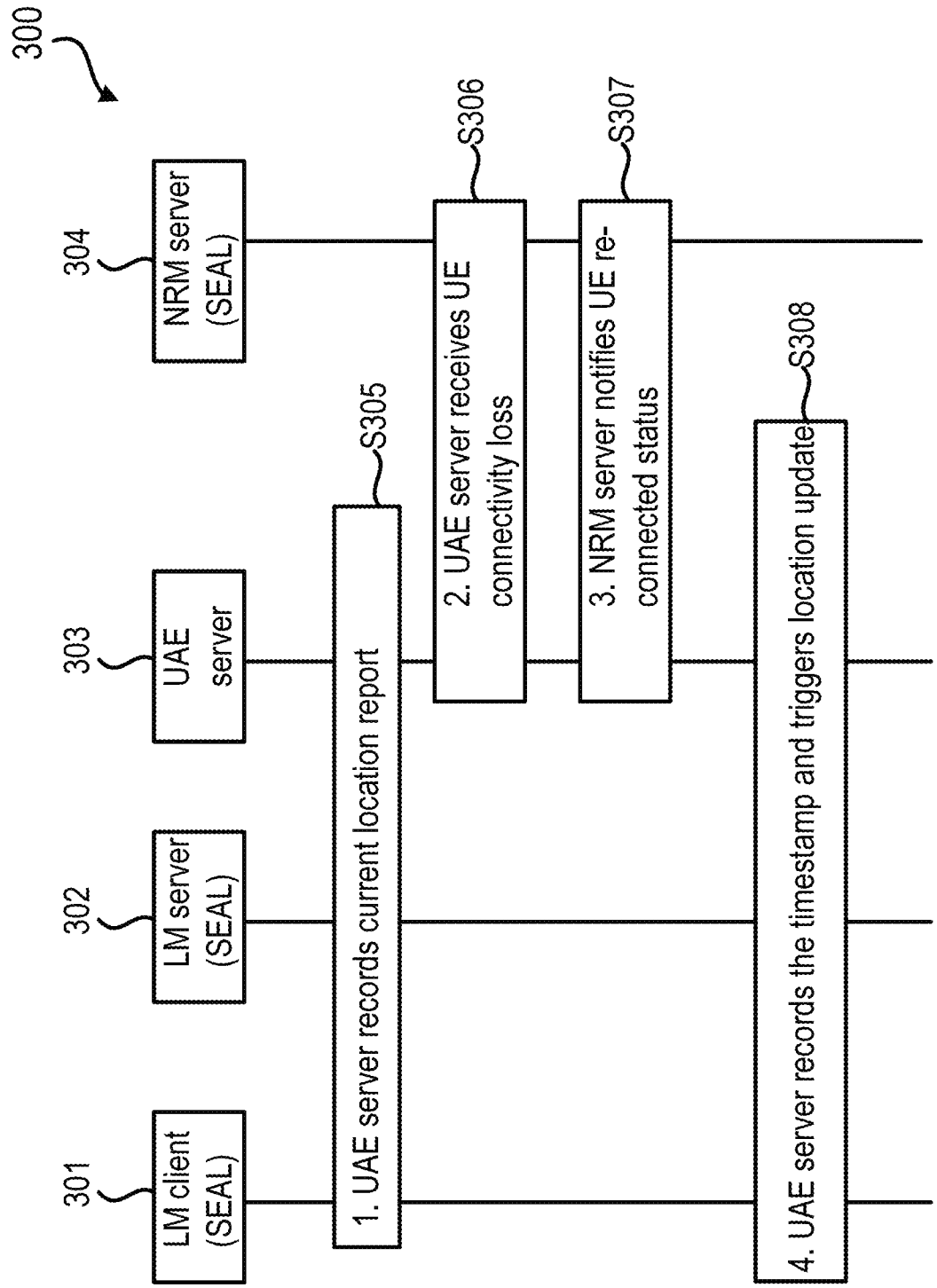
FIG. 3 shows a process (300) of real-time unmanned aerial vehicle (UAV) network connection status monitoring and location updating in accordance with an embodiment.

FIGS. 2 and 3 show a network resource and location management of the SEAL architecture.

A network resource management (NRM) server (304) shown in FIG. 3 can be a SEAL functional entity that provides management of 3GPP system network resources (e.g., unicast, multicast) to support the VAL applications (or VAL clients) (201). The VAL applications can include UAV and V2X, for example.

The interactions related to network resource management functions between a NRM client and the NRM server (304) can be supported by NRM-UU reference point. The NRM client can act as the SEAL client (202) and the NRM-UU can act as the SEAL-UU (209) in FIG. 2.

The interactions related to network resource management functions between the VAL server(s) (203) and the network resource management server (204) can be supported by the NRM-S reference point. The NRM-S reference point can act as the SEAL-S reference point (211). In some embodiments, a UAE server (303) in FIG. 3 can act as the VAL server (203) in FIG. 2, and the NRM server (304) in FIG. 3 can act as the SEAL server (204) in FIG. 2.

Similarly, SEAL location management can provide UAS location information. For example, a location management (LM) client (301) can interact with an LM server (302) and provide location data to the UAE server (303). The LM client (301) can act as the SEAL client (202) and the LM server (302) can act as the SEAL server (204). The interactions related to location management functions between the LM server (302) and the LM client (301) can be supported by LM-S reference point, where the LM-S reference point can act as the SEAL-S reference point (211) in FIG. 2.

In order to get network and location information, the UAE server (303) can subscribe to a connection monitoring service from the NRM server (304) for both the UAV and/or UAV client and also for the location information of the UAV from the LM server (302). In some embodiments, the UAE server (303) can subscribe to the monitoring event Application Programming Interface (API) for connection monitoring by the NRM server (304) for both UAV and/or UAV client.

An exemplary procedure for a VAL server to subscribe to a NRM server can include steps as follows: (i) the VAL server (e.g., UAE server (303)) sends Monitoring Events Subscription request to the NRM server (e.g., NRM server (304)), requesting the NRM server to monitor the events related to the VAL UE(s) (e.g., UAV) as per the subscription request, and can include the information related to the events that the VAL server is interested in; (ii) the NRM server can check if the VAL server is authorized to initiate the Monitoring Events Subscription request and if authorized, can respond with Monitoring Events Subscription Response message, indicating the successful subscription status along with subscription information to the VAL server. The VAL service ID may be used by the NRM server to derive event specific information in 3GPP core network services (e.g., QoS requirement in analytics event subscription), based on a local configuration. The NRM server maps the VAL group ID (if received) to the External Group ID known to the 3GPP core network; (iii) based on the events of interest information in the subscription request message, if applicable, the NRM server can subscribe to the UE monitoring events (e.g., LOSS_OF_CONNECTIVITY, COMMUNICATION_FAILURE etc.) for the set of UEs (VAL UEs) in the subscription request; and (iv) based on the events of interest information in the subscription request message, if applicable, the NRM server can subscribe to the UE analytics events (e.g., ABNORMAL_BEHAVIOUR etc.) for the set of UEs (VAL UEs) in the subscription request.

In some embodiments, the UAE server (303) can subscribe to the location information and location deviation monitoring events of UAV from the LM server (302).

An exemplary procedure of location information subscription to the LM server (302) can include steps as follows: (i) the VAL server sends a location information subscription request to the location management server to subscribe location information of one or more VAL users and/or VAL UEs. The request may include an indication for supplementary location information; (ii) the location management server can check if the VAL server is authorized to initiate the location information subscription request. Further, the location management server may initiate location reporting configuration with the location management client of the UE for immediate reporting; (iii) the location management server may optionally subscribe for UE location information from a 3GPP core network for the UE. If the indication for supplementary location information is included in step 1, then UE location information is obtained from the 3GPP core network; (iv) the location management server determines the UE location information of the UE as received in steps 3 and 4; and (v) the location management server replies with a location information subscription response indicating the subscription status and if immediate reporting was requested, the location information of the VAL UE(s).

When the UAE server has subscribed to the connection monitoring, the location information, and the location deviation monitoring events as mentioned above, the UAE server (303) can receive a location report from the LM server (302), as shown at step (S305) in FIG. 3. The location report can provide location information of the UE. UAE server (303) can record the current location reporting timestamp. In some embodiments, the UAE server (303) can receive the location report and/or location deviation monitoring event notifications from the LM server (302). In some embodiments, the UAE server (303) can record a current location reporting timestamp. In an example, the current location reporting timestamp can indicate a time when the location report is received by the UAE server (303), a time when the location report is sent from the LM server (302), or a time when the location report of the UE is generated. In another example, the current location reporting timestamp can indicate a time when the location information of the UE is captured.

An exemplary procedure of event-trigger location information notification can include steps as follows: (i) the location management server receives the latest location information of the UE as per a location report procedure; (ii) the location management server may optionally receive the location information of the UE from 3GPP core network. If the indication for supplementary location information is included in the subscription, then UE location information is obtained from the 3GPP core network; (iii) based on the configurations, e.g., subscription, periodical location information timer, location management server is triggered to report the latest user location information to VAL server (e.g., UAE server (303)). The location management server determines the location information of UE as received in steps 1 and 2, including the supplementary location information (if indicated); (iv) the location management server sends the location information report including the latest location information of one or more VAL users and/or VAL UEs to the VAL server or to the location management client that has previously configured; and (v) VAL server may further share this location information with a group or another VAL user and/or VAL UE.

An exemplary procedure of monitoring location deviation can include steps as follows: (i) the VAL server (e.g., UAE server (303)) sends Monitor Location Subscription Request to LM server; (ii) LM server (e.g., LM server 302)) processes the Area of interest information in the request, and then subscribes to UE location monitoring\ with appropriate parameters mapping. Based on the subscription, LM server receives the VAL UE location information periodically from the 3GPP core network; (iii) LM server periodically obtains the VAL UE location information; (iv) LM server, after successful subscription according to steps 2 and 3, sends Monitor Location Subscription response, indicating that the LM server accepts VAL server's request and will monitor the location of the VAL UE to verify if the VAL UE is in the area of interest; (v) if the location information received from Location management client and the core network do not match, then the LM server can consider the VAL UE as outside of its specified area of interest and can notify ("Notify Mismatch Location" message) the VAL server; (vi) if the VAL UE's current location is from Location management client and the core network matches, and not in the area of interest received from VAL server in Monitor Location Subscription Request message, then the LM considers the VAL UE as outside of its specified area of interest and can notify the VAL server that the VAL UE's current location is outside of area of interest and VAL UE ID in "Notify Absence" message; and (vii) when the VAL UE's current location is in the area of interest, then the LMS can notify ("Notify Presence" message) the VAL server periodically, according to the "Notify_Interval" value in "Monitor Location Subscription Request" message, indicating to the VAL server that the VAL UE is within the area of interest, along with VAL UE's current location information.

Exemplary data points that are shown in Table 1 can be provided by the LM server to the requesting location management client and/or VAL server to report location information.

TABLE 1

Location information report

| Information element | Status | Description |
| --- | --- | --- |
| Set of identities | M | Set of identities of the reporting VAL users or VAL UEs |
| Triggering event | M | Identity of the event that triggered the sending of the report |
| Location Information | M | Location information |
| Timestamp | O | Timestamp of the location report |

In some embodiments, the current location reporting timestamp can take one of several different time formats, such as ISO 8610 (e.g., yyyy-month-dayTHH:MM:SS), RFC 1123 (e.g., Monday, DD Mon YYYY HH:MM:SS TimeZone), coordinated universal time (UTC: yyyy-mn-ddTHH:MM:SS), and the like.

At step (S306), the UAE server (303) can receive a network event notification from the NRM server (304). The event can be related to loss of UE (e.g., the UAV or the UAV-C) reachability. For example, a network event notification of "Loss_of_connectivity_notification" can be received by the UAE server (303), which indicates a connection loss of the UE to a 3GPP network. Accordingly, the UAE server (303) can record such an event with a current timestamp. The timestamp can indicate a time when the UE is not reachable. The timestamp can also indicate when the network event notification is received by the UAE server (303) or is sent from the NRM server (304).

In some embodiments, the UAE server (303) can receive the monitoring events notification (or the network event notification) from the NRM server (304). For example, a procedure for the NRM server (e.g., NRM server (304)) notifying the VAL server (e.g., UAE server (303)) with VAL UE(s) related events can include steps as follows: (i) if applicable, the NRM server receives the VAL UE related monitoring event notifications from the 3GPP core network; (ii) if applicable, the NRM server receives the VAL UE related Analytics event notifications from the 3GPP core network; and (iii) the NRM server notifies the VAL server about the events related to the VAL UE in Notify Monitoring Events message. If multiple events are to be notified, then the NRM server may aggregate the notifications and send to the VAL server.

At step (S307), the NRM server (304) can send a notification to the UAE server (303) when a UE re-connected status is detected. The notification can indicate that the UE is reconnected to the network, such as the 3GPP network (213).

At step (S308), the UAE server (303) can record such an event with a current timestamp, plus with a last known location information and a timestamp. Thus, the UAE server (303) can record the notification from the NRM server (304) that indicates the UE is reconnected to the network and a timestamp associated with the notification. The timestamp can indicate a time when the notification is received or sent. The timestamp can also indicate when the UE is reconnected to the network. Similarly, the UAE server can record the most recently updated location information of the UE from the LM server (302) and the associated timestamp. The time stamp associated with the most recently updated location information can indicate one or more of a time when the most recently updated location information is generated, a time when the most recently updated location information is sent by the LM server (302), and a time when the most recently updated location information is received by the UAE server (303).

In some embodiments, the UAE server (303) can record the notfication of the reconnection of the UE and the associated timestamp, and the last known location information of the UE and the associated timestamp. The LM server can provide one or more data points, such as the ones shown in Table 2, to the VAL server (e.g., UAE server) or the location management client.

TABLE 2

Location information notification

| Information element | Status | Description |
| --- | --- | --- |
| Identities list | M | List of the VAL users or VAL UEs whose location information needs to be notified |
| Identity | M | Identity of the VAL user or VAL UE subscribed to location of another VAL user or VAL UE (NOTE) |
| Triggering event | M | Identity of the event that triggered the sending of the notification |
| Location Information | M | Location information |
| Timestamp | O | Timestamp of the location report |

(NOTE):
This is only used for location management server sends location information notification to the VAL user or VAL UE who has subscribed the location.

In some embodiments, as shown at step (308), the UAE server (303) can further trigger a location update when the UAE server (303) receives the notification of the reconnection of the UE. For example, the UAE server (303) can trigger the location update. Accordingly, the LM server (302) can request UE location information by sending a location information request to the LM client (301). A VAL user or VAL UE is notified and asked about the permission to share its location. The LM client (e.g., 301) responds to the location management server with a report containing location information. Further, the LM server (302) can send the location report of the UE to the UAE server (303) to provide real-time location information of the UE.

In some embodiments, the UAE server (303) can record data points shown in Table 3. The data points can be recorded in the step (308) of FIG. 3 for example.

TABLE 3

Data points from real time network monitoring and location updating

| Information element | Status | Description |
| --- | --- | --- |
| UAE Server ID | M(andatory) | The identifier of the UAE server which provides real-time network connection and location update |
| Network Event information | M | Network event information received from NRM server |
| Location Information | M | The updated location information (e.g., most recently updated or most up to date location information) received from LM server |

As shown in Table 3, the network event information can be included in the notification from the NRM server (304) that indicates the loss connection of the UE. The network event information can also be included in the notification from NRM server (304) to indicate the reconnection of the UE. The UAE server ID can be the identifier (or identity) of the UAE server (303) that provides real-time network connection status monitoring and location updates. The location information can indicate the updated location information received from the LM server (302). The updated location information can include the most recently updated location information. For example, the most recently updated location information can be a most recently updated location information obtained from LM server prior to the disconnection of UE to the network. The most recently updated location information can also be a most recently updated location information obtained from LM server after the re-connection of the UE to the network.

Figure 4:
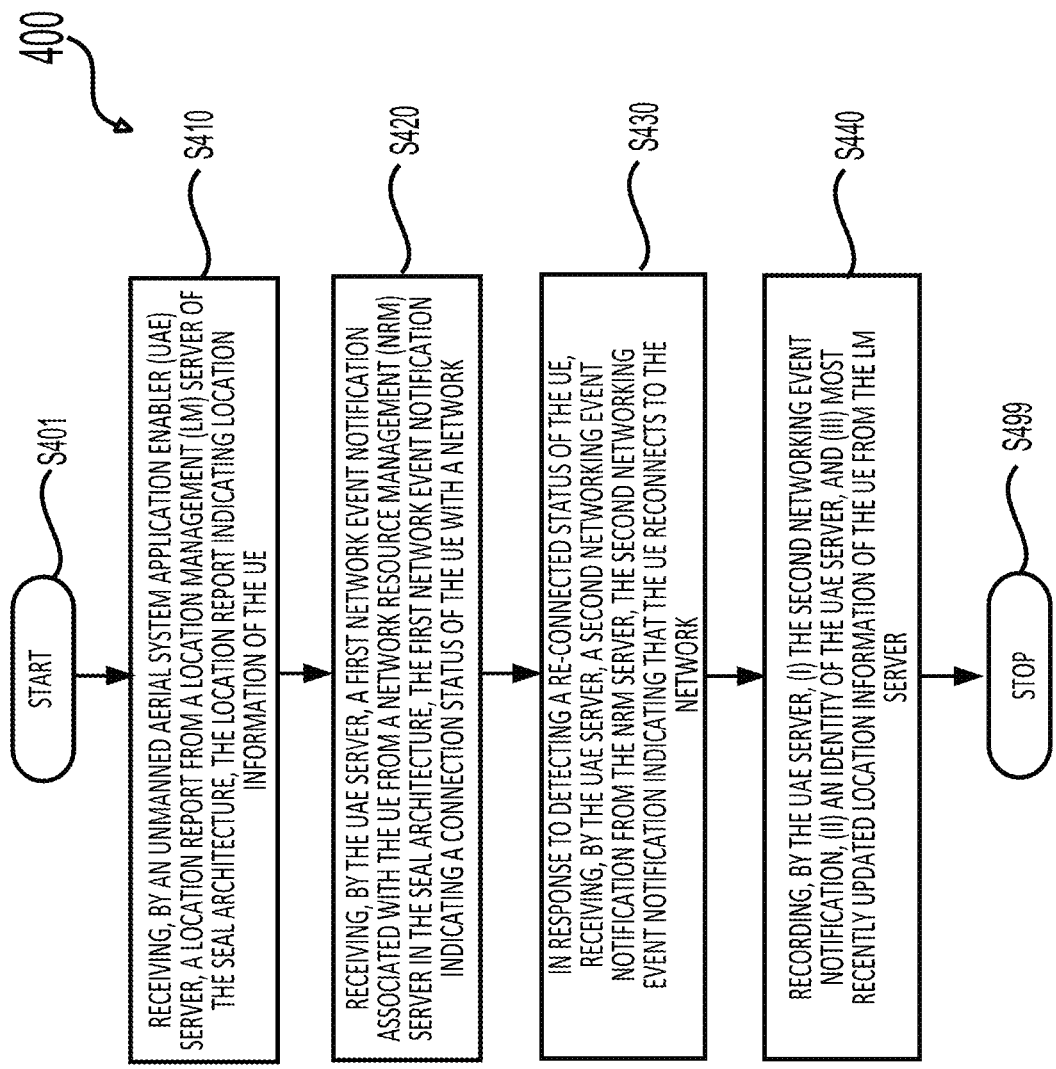
FIG. 4 shows a flow chart outlining a process of real-time network connection status monitoring and/or location updating according to some embodiments of the disclosure.

FIG. 4 shows a process (400) of real-time network monitoring and location updating. As shown in FIG. 4, the process (400) can start from step (S401) and proceed to step (S410), a location report can be received by a first server, for example from a second server. The location report can be received by an unmanned aerial system application enabler (UAE) server from a location management (LM) server of the SEAL architecture. The location report can indicate location information of the UE.

At step (S420), a first network event notification associated with the UE can be received by the UAE server from a network resource management (NRM) server in the SEAL architecture. The first network event notification can indicate a connection status of the UE with a network.

At step (S430), in response to detecting a re-connected status of the UE, a second networking event notification can be received by the UAE server from the NRM server, where the second networking event notification can indicate that the UE reconnects to the network.

At step (S440), (i) the second networking event notification, (ii) an identity of the UAE server, and (iii) most recently updated location information of the UE from the LM server can be recorded by the UAE server.

In some embodiments, in response to receiving the location report from the LM server, a timestamp associated with the location report can be recorded by the UAE server, where the timestamp can indicate a time when the location report is received.

In the process (400), in response to the first network event notification indicating an event of a connection loss of the UE, the event and a timestamp associated with the event can be recorded by the UAE server, where the timestamp can indicate a time when the event occurs.

In the process (400), a timestamp of the second network event notification can be recorded by the UAE server, where the timestamp can indicate a time when the UE is reconnected to the network.

In some embodiments, a timestamp of the most recently updated location information can be recorded by the UAE server. The timestamp can indicate a time when the most recently updated location information of the UE is received.

In the process (400), a location update between the LM server and a LM client can be triggered by the UAE server.

In some embodiments, the triggering the location update can cause the LM server to send a location information request to the LM client. The location information report can be sent to the LM server by the LM client in response to the location information request. The location information report can indicate the most recently updated location information.

In some embodiments, the UAE server can be subscribed to (i) the real-time network monitoring from the NRM server, and (ii) the location updating from the LM server.

Aspects of the Unmanned Aerial System Communication, described above, can be implemented in both a controller and a UAV as computer software using computer-readable instructions and physically stored in one or more computer-readable media, such as one or more non-transitory computer-readable storage mediums. For example, FIG. 5 shows a computer system 600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by processing circuitry such as computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
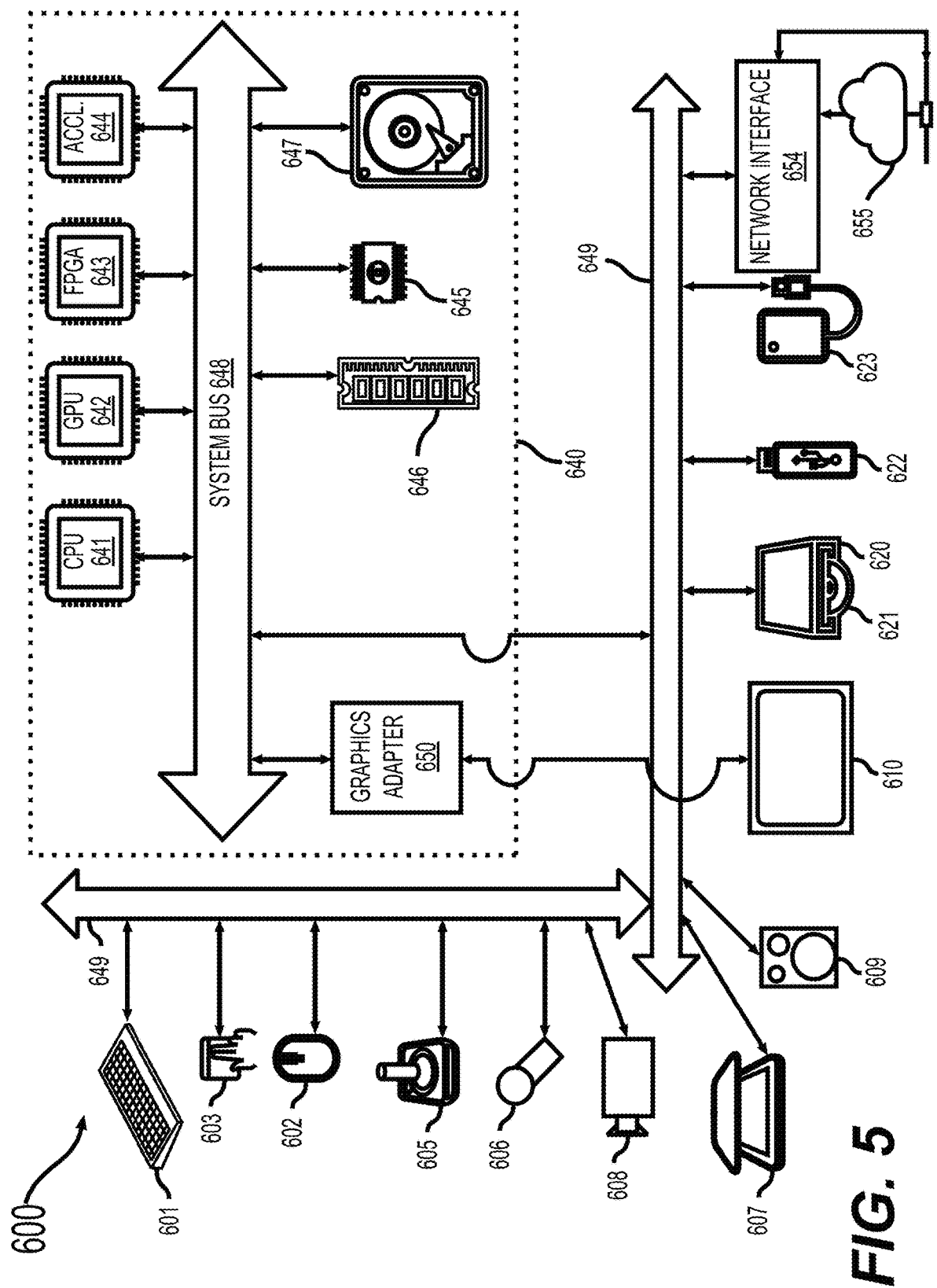
FIG. 5 is a schematic illustration of a computer system in accordance with an embodiment.

The components shown in FIG. 5 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include an interface (654) to one or more communication networks (655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), graphics adapters (650), and so forth. These devices, along with Read-only memory (ROM) (645), Random-access memory (646), internal mass storage such as internal non-user accessible hard drives, SSDs, and the like (647), may be connected through a system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). In an example, the screen (610) can be connected to the graphics adapter (650). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600), and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of real-time network monitoring and location updating for a user equipment (UE) in a service enabler architecture layer (SEAL) architecture, the method comprising:
   receiving, by an unmanned aerial system application enabler (UAE) server, a location report from a location management (LM) server of the SEAL architecture, the location report indicating location information of the UE;
   receiving, by the UAE server, a first network event notification associated with the UE from a network resource management (NRM) server in the SEAL architecture, the first network event notification indicating a connection status of the UE with a network;
   in response to detecting a re-connected status of the UE, receiving, by the UAE server, a second networking event notification from the NRM server, the second networking event notification indicating that the UE reconnects to the network; and
   recording, by the UAE server, (i) the second networking event notification, (ii) an identity of the UAE server, and (iii) most recently updated location information of the UE from the LM server.

2. The method of claim 1, further comprising:
   in response to receiving the location report from the LM server, recording, by the UAE server, a timestamp associated with the location report, the timestamp indicating one of a time when the location report is received by the UAE server, a time when the location report is sent by the LM server, and a time when the location report is generated by the LM server.

3. The method of claim 1, further comprising:
   in response to the first network event notification indicating an event of a connection loss of the UE, recording, by the UAE server, the event and a timestamp associated with the event, the timestamp indicating a time when the event occurs.

4. The method of claim 1, further comprising:
   recording, by the UAE server, a timestamp of the second network event notification, the timestamp indicating a time when the UE is reconnected to the network.

5. The method of claim 1, further comprising:
   recording, by the UAE server, a timestamp of the most recently updated location information, the timestamp indicating one of a time when the most recently updated location information of the UE is received by the UAE server, a time when the most recently updated location information of the UE is sent by the LM server, and a time when the most recently updated location information of the UE is generated.

6. The method of claim 1, further comprising:
   triggering a location update, by the UAE server, between the LM server and a LM client.

7. The method of claim 6, wherein
   the triggering further includes causing the LM server to send a location information request to the LM client, and
   the location information report is sent to the LM server by the LM client in response to the location information request, the location information report indicating the most recently updated location information.

8. The method of claim 1, wherein:
   the UAE server is subscribed to (i) the real-time network monitoring from the NRM server, and (ii) the location updating from the LM server.

9. An apparatus, comprising:
   processing circuitry configured to:
   receive a location report from a location management (LM) server of a service enabler architecture layer (SEAL) architecture, the location report indicating location information of a user equipment (UE);
   receive a first network event notification associated with the UE from a network resource management (NRM) server in the SEAL architecture, the first network event notification indicating a connection status of the UE with a network;
   in response to detecting a re-connected status of the UE, receive a second networking event notification from the NRM server, the second networking event notification indicating that the UE reconnects to the network; and record (i) the second networking event notification, (ii) an identity of the apparatus, and (iii) most recently updated location information of the UE from the LM server.

10. The apparatus of claim 9, wherein the processing circuitry is configured to:
in response to the location report being received from the LM server, record a timestamp associated with the location report, the timestamp indicating one of a time when the location report is received by the apparatus, a time when the location report is sent by the LM server, and a time when the location report is generated by the LM server.

11. The apparatus of claim 9, wherein the processing circuitry is configured to:
in response to the first network event notification indicating an event of a connection loss of the UE, record the event and a timestamp associated with the event, the timestamp indicating a time when the event occurs.

12. The apparatus of claim 9, wherein the processing circuitry is configured to:
record a timestamp of the second network event notification, the timestamp indicating a time when the UE is reconnected to the network.

13. The apparatus of claim 9, wherein the processing circuitry is configured to:
record a timestamp of the most recently updated location information, the timestamp indicating one of a time when the most recently updated location information of the UE is received by the apparatus, a time when the most recently updated location information of the UE is sent by the LM server, and a time when the most recently updated location information of the UE is generated.

14. The apparatus of claim 9, wherein the processing circuitry is configured to:
trigger a location update between the LM server and a LM client.

15. The apparatus of claim 14, wherein:
the trigger causes the LM server to send a location information request to the LM client, and
the location information report is sent to the LM server by the LM client in response to the location information request, the location information report indicating the most recently updated location information.

16. The apparatus of claim 9, wherein:
the apparatus is subscribed to (i) real-time network monitoring from the NRM server, and (ii) location updating from the LM server.

17. A non-transitory computer readable storage medium storing instructions which when executed by at least one processor of an unmanned aerial system application enabler (UAE) server cause the at least one processor to perform:
receiving a location report from a location management (LM) server of a service enabler architecture layer (SEAL) architecture, the location report indicating location information of a user equipment UE;
receiving a first network event notification associated with the UE from a network resource management (NRM) server in the SEAL architecture, the first network event notification indicating a connection status of the UE with a network;
in response to detecting a re-connected status of the UE, receiving a second networking event notification from the NRM server, the second networking event notification indicating that the UE reconnects to the network; and
recording (i) the second networking event notification, (ii) an identity of the UAE server, and (iii) most recently updated location information of the UE from the LM server.

18. The non-transitory computer readable storage medium according to claim 17, wherein the instructions which when executed by the at least one processor cause the at least one processor to perform:
in response to receiving the location report from the LM server, recording a timestamp associated with the location report, the timestamp indicating one of a time when the location report is received, a time when the location report is sent by the LM server, and a time when the location report is generated by the LM server.

19. The non-transitory computer readable storage medium according to claim 17, wherein the instructions which when executed by the at least one processor cause the at least one processor to perform:
in response to the first network event notification indicating an event of a connection loss of the UE, recording the event and a timestamp associated with the event, the timestamp indicating a time when the event occurs.

20. The non-transitory computer readable storage medium according to claim 17, wherein the instructions which when executed by the at least one processor cause the at least one processor to perform:
recording a timestamp of the second network event notification, the timestamp indicating a time when the UE is reconnected to the network.

* * * * *